(12) United States Patent
Niwa

(10) Patent No.: US 10,894,483 B2
(45) Date of Patent: Jan. 19, 2021

(54) POWER TRANSMISSION DEVICE, POWER RECEPTION DEVICE, AND CONTROL METHOD FOR POWER TRANSMISSION DEVICE

(71) Applicant: Toyota Jidosha Kabushiki Kaisha, Toyota (JP)

(72) Inventor: Yamato Niwa, Kariya (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 0 days.

(21) Appl. No.: 16/553,955

(22) Filed: Aug. 28, 2019

(65) Prior Publication Data

US 2020/0070681 A1 Mar. 5, 2020

(30) Foreign Application Priority Data

Aug. 31, 2018 (JP) ................. 2018-162612

(51) Int. Cl.
*B60L 53/66* (2019.01)
*B60L 53/12* (2019.01)
*H02J 50/12* (2016.01)
*H02J 7/02* (2016.01)
*H02J 50/80* (2016.01)

(52) U.S. Cl.
CPC ............. *B60L 53/66* (2019.02); *B60L 53/12* (2019.02); *H02J 7/025* (2013.01); *H02J 50/12* (2016.02); *H02J 50/80* (2016.02)

(58) Field of Classification Search
None
See application file for complete search history.

(56) References Cited

U.S. PATENT DOCUMENTS

| 2013/0127409 A1 | 5/2013 | Ichikawa |
| 2013/0193749 A1 | 8/2013 | Nakamura et al. |
| 2015/0008877 A1 | 1/2015 | Ichikawa et al. |
| 2015/0236518 A1* | 8/2015 | Matsumoto ............. H02J 7/025 307/104 |

(Continued)

FOREIGN PATENT DOCUMENTS

| JP | 2012191721 A | 10/2012 |
| JP | 2013110822 A | 6/2013 |

(Continued)

*Primary Examiner* — Jared Fureman
*Assistant Examiner* — Aqeel H Bukhari
(74) *Attorney, Agent, or Firm* — Dinsmore & Shohl LLP

(57) ABSTRACT

The power transfer system includes a power transmission device and a power reception device disposed in the vehicle. The power transmission device includes a power transmission coil configured to transmit power in a wireless manner to the power reception device, an inverter configured to generate an AC transmission power and supply it to the power transmission coil, and a power supply ECU. When the transmission of power to the power reception device is started, the power supply ECU sets the transmission power at the start of power transmission to a first power which is lower than a second power, and performs the operating point search control in that state. If the reception power is lower than a tai et reception power after the operating point search control is completed, the power supply ECU sets the transmission power to the second power which is higher than the first power.

9 Claims, 10 Drawing Sheets

(56) References Cited

U.S. PATENT DOCUMENTS

2017/0025898 A1* 1/2017 Misawa .............. H02M 3/3376

FOREIGN PATENT DOCUMENTS

| JP | 2013126327 A | 6/2013 |
| JP | 2013146148 A | 7/2013 |
| JP | 2013146154 A | 7/2013 |
| JP | 2013154815 A | 8/2013 |
| JP | 2017201879 A | 11/2017 |
| JP | 2018007509 A | 1/2018 |

* cited by examiner

POWER TRANSMISSION DEVICE, POWER RECEPTION DEVICE, AND CONTROL METHOD FOR POWER TRANSMISSION DEVICE

CROSS REFERENCE TO RELATED APPLICATIONS

This nonprovisional application claims priority to Japanese Patent Application No. 2018-162612 filed on Aug. 31, 2018 with, the Japan Patent Office, the entire contents of which are hereby incorporated by reference.

BACKGROUND

Field

The present disclosure relates to a power transmission device that transmits power in a wireless manner, a power reception device, and a control method for the power transmission device.

Description of the Background Art

Japanese Patent Laying-Open No. 2018-7509 discloses a system for transmitting power in a wireless manner from a power transmission device disposed outside a vehicle to a power reception device mounted on the vehicle. The power transmission device included in the system includes a power transmission coil, an inverter, and a controller. The power transmission coil is configured to transmit power in a wireless manner to a power reception coil included in the power reception device mounted on the vehicle. The inverter is configured to generate an AC current in response to the driving frequency and output it to the power transmission coil. The controller is configured to perform an operating point search control so as to search for an optimal operating point at which the power transmission efficiency is optimal by altering the driving frequency of the inverter during the transmission of power from the power transmission coil in a wireless manner and cause the inverter to operate at the searched optimal operating point.

SUMMARY

The power transmission efficiency for transmitting power in a wireless manner from the power transmission device to the power reception device may be varied by various factors. These factors include factors that are fixed at the initial state when the power transmission is started and will maintain substantially invariable during the one-time power transmission (hereinafter referred to as "initial factors" such as the variation of parts or the relative position of the power reception device to the power transmission device) and factors that may vary actively during the one-time power transmission (hereinafter referred to as "variable factors" such as the driving frequency of an inverter). Therefore, if the power transmission is started after the initial factors are fixed (the relative position of the power reception device is fixed) while the variable factors are not fixed (after the operating point search control is completed), the power transmission efficiency is not fixed. Therefore, even if the transmission power is set to a large value close to the maximum output of sire power transmission device at the start of power transmission, the power transmission efficiency may become equal to the maximum efficiency depending on the combination of the initial factors and the variable factors, and as a result, the reception power may become very large, which makes it necessary to design an allowable reception power of the power reception device to a very large value. As a result, the size and cost of the power reception device may increase adversely.

The present disclosure has been made to solve the problems mentioned above, and an object of the present disclosure is to transmit an appropriate amount of power in a wireless manner from a power transmission device to a power reception device while preventing the size and cost of the power reception device from increasing.

(1) The power transmission device according to the present disclosure includes a power transmission coil configured to transmit power in a wireless manner to a power reception device, an inverter configured to generate an AC transmission power and supply the transmission power to the transmission coil, and a controller configured to control the inverter so as to control the transmission power. The controller is configured to perform an operating point search control. The operating point search control is a control to search an optimal operating point at which a power transmission efficiency for transmitting power to the power reception device is optimal by altering an operating point of the inverter during the transmission of power to the power reception device, and cause the inverter to operate at the searched optimal operating point. The controller sets the transmission power to a first power when the transmission of power to the power reception device is started, and performs the operating point search control while the transmission power is being set to the first power. The controller maintains the transmission power at the first power if a reception power received by the power reception device is equal to or higher than a target reception power after the operating point search control is completed, and sets the transmission power to a second power which is higher than the first power if the reception power is lower than the target reception power offer the operating point search control is completed.

In the power transmission device mentioned above, the operating point search control is performed while the transmission power is being set to the first power lower than the second power at the start of power transmission. Thus, compared to the case where the operating point search control is performed while the transmission power is being set to the second power, it is possible to lower the reception power during the operating point search control, which makes it possible to design the allowable reception power of the power reception device to a lower value, preventing the size and cost of the power reception device from increasing. After the operating point search control is completed (after the power transmission efficiency is determined), if the reception power is lower than the target reception power, the transmission power is increased from the first power to the second power. Thereby, the reception power may be brought close to the target reception power. As a result, it is possible to transom an appropriate amount of power in a wireless manner from the power transmission device to the power reception device while preventing the size and cost of the power reception device from increasing.

(2) In one aspect, the first power is set in such a manner that when the first power is transmitted at a predetermined maximum efficiency the reception power is lower than an allowable reception power of the power reception device. The second power is set in such a manner that when the second power is transmitted at a predetermined minimum efficiency, the reception power is equal to or higher than the target reception power.

According to the above aspect, even if the power transmission efficiency becomes equal to the predetermined maximum efficiency while the transmission power is being set to the first power, it is possible to ensure that the reception power is lower than the allowable reception power of the power reception device. On the other hand, even if the power transmission efficiency becomes equal to the predetermined minimum efficiency while the transmission power is being set to the second power, it is possible to ensure that the reception power is equal to or higher than the target reception power.

(3) In one aspect, the power transmitting device further includes a communication device configured to communicate with the power reception device. The controller sends a search completion signal to the power reception device when the operating point search control is completed, and sets the transmission power to the second power if the amount of the reception power received from the power reception device is lower than the amount of the target reception power after the search completion signal is sent.

According to the above aspect, the power transmission device may receive the amount of the reception power from the power reception device after the operating point search control is completed (after the power transmission efficiency is determined). If the amount of the reception power is lower than the amount of the target reception power, the transmission power is increased from the first power to the second power. Therefore, it is possible to transmit an appropriate amount of power according to the actual power transmission efficiency.

(4) The power reception device according to the present disclosure includes a power reception coil configured to receive power transmitted from a power transmission device in a wireless manner, a communication device configured to communicate with the power transmission device, and a controller configured to calculate a reception power received, by the reception coil. The controller sends the amount of the reception power to the power transmission device in response to the reception of a search completion signal from the power transmission device. The search completion signal is sent from the power transmission device when, an operating point search control is completed in the power transmission device. The operating point search control is a control to search for an operating point at which the power transmission efficiency from the power transmission device to the power reception coil is optimal.

The power reception device sends the amount of the reception power to the power transmission device in response to the reception of a search completion signal from the power transmission device. The search completion signal is sent from the power transmission device when the operating point search control is completed in the power transmission device. Therefore, the power reception device may send to the power transmitting device the amount of the reception power transmitted at a power transmission efficiency after the initial factors and the variable factors are determined. Therefore, it is possible to set the transmission power in the power transmission device in relation to the actual amount of the reception power after the power transmission efficiency is determined. As a result, it is possible to transmit an appropriate amount of power in a wireless manner from the power transmission device to the power reception device.

(5) The control, method according to the present disclosure is a control method for a power transmission device. The power transmission device includes a power transmission coil configured to transmit power in a wireless manner to a power reception device, and an inverter configured to generate an AC transmission power and supply the transmission power to the transmission coil. The control method includes: setting the transmission power to a first power when the transmission of power to the power reception device is started; performing an operating point search control while the transmission power is being set to the first power; maintaining the transmission power at the first power if a reception power received by the power reception device is equal to or higher than a target reception power after the operating point search control is completed; and setting the transmission power to a second power which is higher than the first power if the reception power is lower than the target reception power after the operating point search control is completed. The operating point search control is a control to search for an optimal operating point at which a power transmission efficiency for transmitting power to the power reception device is optimal by altering an operating point of the inverter during the transmission of power to the power reception device, and cause the inverter to operate at the readied optimal operating point.

In the above method, the operating point search control is performed while the transmission power is being set to the first power lower than the second power at the start of power transmission. Thus, compared to the case where the operating point search control is performed while the transmission power is being set to the second power, it is possible to lower the reception power during the operating point search control, which makes it possible to design the allowable reception power of the power reception device to a lower value, preventing the size and cost of the power reception device from increasing. After the operating point search control is completed (after the power transmission efficiency is determined), if the reception power is lower than the target reception power, the transmission power is increased from the first power to the second power. Thereby, the reception power may be brought close to the target reception power. As a result, it is possible to transmit an appropriate amount of power in a wireless manner from the power transmission device to the power reception device while preventing the size anti cost of the power reception device from increasing.

(6) The power transmission device according to another aspect of the present disclosure includes a power transmission coil configured to transmit power in a wireless manner to a power reception device, an inverter configured to generate an AC transmission power and supply the transmission power to the transmission coil, and a controller configured to control the inserter so as to control the transmission power. The controller estimates a power transmission efficiency for transmitting power to the power reception device based on a relative position of the power reception device to the power transmission coil before transmitting power to the power reception device. The controller sets the transmission power to a first power if the estimated power transmission efficiency is equal to or greater than a threshold or sets the transmission power to a second power which is higher than the first power if the estimated power transmission efficiency is smaller than the threshold. Then, the controller starts transmitting the set transmission power to the power reception device.

According to the power transmission device mentioned above, the power transmission efficiency is estimated based on the relative position of the power reception device to the power transmission coil (the initial factor) before the start of power transmission. If the estimated power transmission efficiency is equal to or higher than the threshold, the power transmission is started at the first power lower than the second power. As a result, it is possible to lower the reception power at the start of power transmission, which makes it possible to design the allowable reception power of the power reception device to a lower value, preventing the size and cost of the power reception device from increasing. On the other hand, if the estimated power transmission efficiency is smaller than the threshold, the power transmission is started at the second power higher than the first power. Thereby, it is possible to prevent the reception, power from being reduced too low at the start of the power transmission. As a result, it is possible to transmit an appropriate amount of power in a wireless manner from the power transmission device to the power reception device while preventing the size and cost of the power reception device from increasing.

(7) In an aspect, the first power is set in such a manner that when the first power is transmitted at a predetermined maximum efficiency, the reception power received by the power reception device is lower than an allowable reception power of the power reception device, and the second power is set in such a manner that when the second power is transmitted at a predetermined minimum efficiency, the reception power is equal to or higher than the target reception power.

According to the above aspect, even if the power transmission efficiency becomes equal to the predetermined maximum efficiency while the transmission power is being set to the first power, it is possible to ensure that the reception power is lower than the allowable reception power of the power reception device. On the other hand, even if the power transmission efficiency becomes equal to the predetermined minimum efficiency while the transmission power is being set to the second power, it is possible to ensure that the reception power is equal to or higher than the target reception power.

(8) In one aspect, the power transmission device further includes a camera configured to detect the relative position. The controller is configured to estimate the power transmission efficiency based on the relative position detected by the camera.

According to the above aspect, the power transmission efficiency may be estimated from the relative position detected by the camera provided in the power transmission device.

(9) The control method according to another aspect of the present disclosure is a control method for a power transmission device. The power transmission device includes a power transmission coil configured to transmit power in a wireless manner to a power reception device, and an inverter configured to generate an AC transmission power and supply the transmission power to the transmission coil. The control method includes: estimating a power transmission efficiency for transmitting power to the power reception device based on the relative position of the power reception device to the power transmission coil before transmitting power to the power reception device; setting the transmission power to a first power if the estimated power transmission efficiency is equal to or greater than a threshold; setting the transmission power to a second power which is higher than the first power if the estimated power transmission efficiency is smaller than the threshold; and starting transmitting the set transmission power to the power reception device.

According to the control method mentioned above, the power transmission efficiency is estimated based on the relative position of the power reception device to the power transmission coil the initial factor) before the start of power transmission. If the estimated power transmission efficiency is equal to or higher than the threshold, the power transmission is started at the first power lower than the second power. As a result, it is possible to lower the reception power at the start of power transmission, which makes it possible to design the allowable reception power of the power reception device to a lower value, preventing the size and cost of the power reception device from increasing. On the other hand, if the estimated power transmission efficiency is smaller than the threshold, the power transmission is started at the second power higher than the first power. Thereby, it is possible to prevent the reception power from being reduced too low at the start of the power transmission. As a result, it is possible to transmit an appropriate amount of power in a wireless manner from the power transmission device to the power reception device while preventing the size and cost of the power reception device from increasing.

The foregoing and other objects, features, aspects and advantages of the present disclosure will become more apparent from the following detailed description of the present disclosure when taken in conjunction with the accompanying drawings.

DETAILED DESCRIPTION

Figure 1:
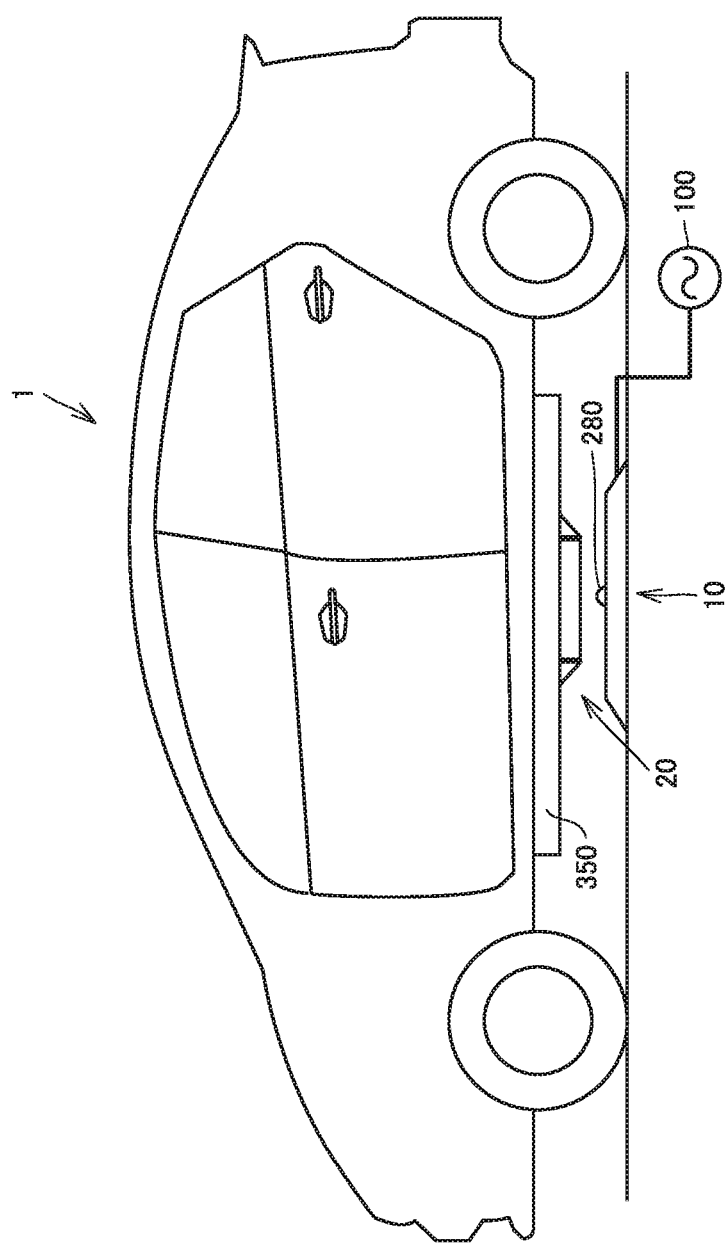
FIG. 1 is an external view of a power transfer system.

Hereinafter, embodiments of the present disclosure will be described in detail with reference to the drawings, in the drawings, the same or corresponding portions are denoted by the same reference numerals and the description thereof will not be repeated.

First Embodiment

<Configuration of Power Transfer System>

FIG. 1 is an external view of a power transfer system including a power transmission device 10 according to the present embodiment. The power transfer system includes a vehicle 1 and a power transmission device 10. The vehicle 1 is equipped with a power reception device 20. The power reception device 20 is disposed on the bottom surface of the vehicle 1, the example, on a lower surface (facing the road) of a power storage device 350 installed, on the bottom surface of the vehicle 1, The vehicle 1 is configured to travel by using the power supplied from the power transmission device 10 and stored in the power storage device 350.

The power transmission device 10 receives power from an AC power supply (for example, a commercial power supply) 100. The power transmission device 10 is installed on the ground. The power transmission device 10 is configured to transmit power in a wireless manner to the power reception device 20 through a magnetic field when the vehicle 1 is aligned such that the power reception device 20 of the vehicle 1 faces the power transmission device 10.

The power transmission device 10 includes a camera 280. The camera 280 is equipped with a fisheye lens and is disposed substantially at the center of the upper surface of the power transmission device 10. Since the camera 280 is equipped with a fisheye lens, it is possible for it to capture a wide space including the power reception device 20 when the vehicle 1 is being moved toward the power transmission device 10.

Figure 2:
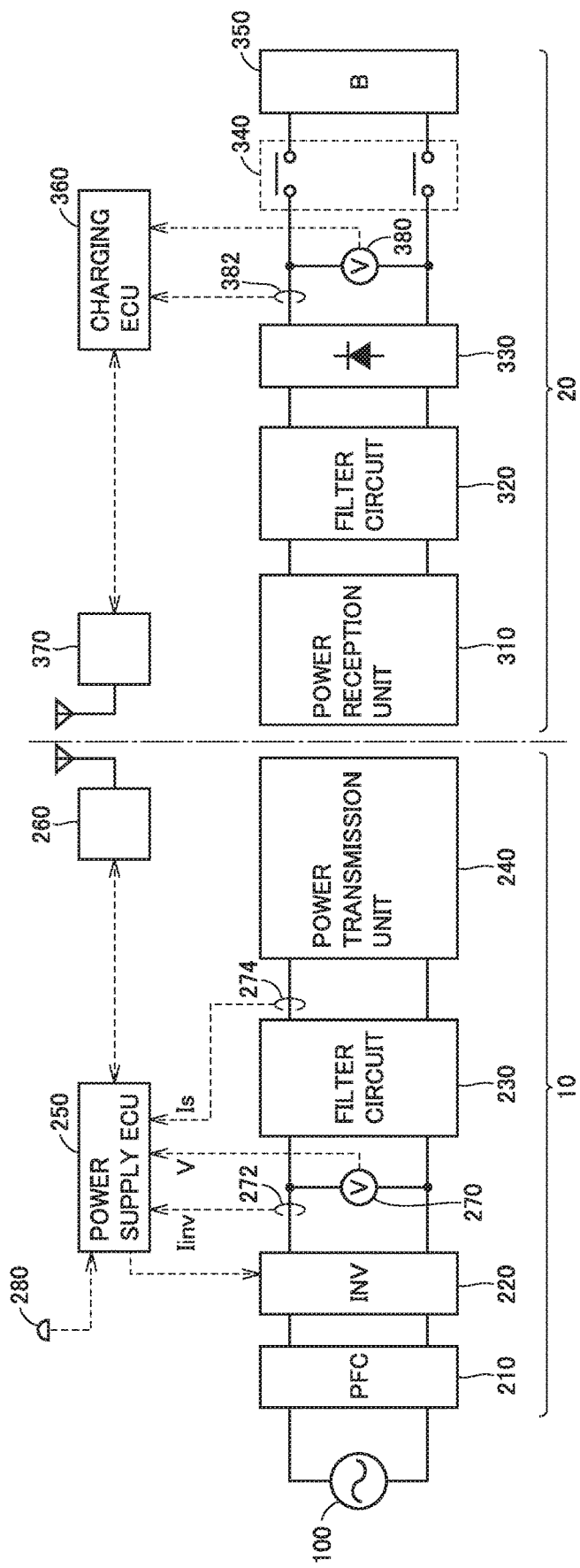
FIG. 2 is a diagram illustrating an overall configuration of a power transmission device and a power reception device.

FIG. 2 is a diagram illustrating art overall configuration of the power transmission device 10 and the power reception device 20. The power transmission device 10 includes a PFC (Power Factor Correction) circuit 210, an inverter 220, a filter circuit 230, a power transmission unit 240, a power supply ECU (Electronic (Control Unit) 250, a communication unit 260, and a voltage sensor 270, a current sensor 272, a current sensor 274, and the camera 280 mentioned above.

The PFC circuit 210 rectifies and boosts the power received from the AC power supply 100 such as the commercial power supply and supplies it to the inverter 220 while corrects the power factor by bringing the input current closer to a sine wave. Various known PFC circuits may be used as the PFC circuit 210, Note that a rectifier that does not have the power factor correction function may be used to replace the PFC circuit 210.

The inverter 220 is controlled by the power supply ECU 250, and is configured to convert a DC power received from the PFC circuit 210 into an (AC) power to be transmitted with a predetermined frequency (for example, several tens of kHz). The driving frequency (switching frequency) f of the inverter 220 may be altered according to a control signal received from the power supply ECU 250, and as a result, the frequency of the power to be transmitted is adjusted. The transmission power generated by the inverter 220 is supplied to the power transmission unit 240 through the filter circuit 230. The inverter 220 may be constituted by a single-phase full bridge circuit, for example.

The filter circuit 230 is provided between the inverter 220 and the power transmission unit 240, and is configured to suppress harmonic noise generated from the inverter 220. The filter circuit 230 may be constituted by an LC filter including an inductor and a capacitor, for example.

The power transmission unit 240 receives from the inverter 220 through the filter circuit 230 the AC power (transmission power) generated by the inverter 220, and transmits the power in a wireless manner to the power reception unit 310 of the power reception device 20 through a magnetic field generated around the power transmission unit 240. The power transmission unit 240 includes a resonance circuit (not shown) for transmitting power in a wireless manner to the power reception unit 310. The resonance circuit may be constituted by a coil and a capacitor. However, if a desired resonance may be formed by the coil alone, the capacitor may be dispensed with.

The voltage sensor 270 detects a voltage V output from the inverter 220 and outputs the detected value to the power supply ECU 250. The current sensor 272 detects a current flowing through the inverter 220, that is, a current Iinv output from the inverter 220, and outputs the detected value to the power supply ECU 250. It should be noted that the power supplied From the inverter 220 to the power transmission unit 240 to be transmitted (hereinafter also referred to as "transmission power Ps") may be detected based on the detection values of the voltage sensor 270 and the current sensor 272. The current sensor 274 detects a current is flowing through the power transmission unit 240, and outputs the detected value to the power supply ECU 250.

The power supply ECU 250 includes a CPU (Central Processing Unit), a memory, an input/output port for inputting/outputting various signals and the like (none of which is shown), and is configured to receive a signal from, each sensor mentioned above and execute a control on various units provided in the power transmission device 10. For example, when the powers to be transmitted from the power transmission device 10 to the power reception device 20, the power supply ECU 250 performs a switching control on the inverter 220 such that the inverter 220 generates the (AC) transmission power Ps. Note that the control is not necessarily processed by software, it may be processed by dedicated hardware (such as an electronic circuit).

During the transmission of power from the power transmission device 10 to the power reception device 20, the power supply ECU 250 according to the present embodiment performs a control so as to set the transmission power Ps to a target transmission power. Specifically, the power supply ECU 250 performs a feedback control so as to set the transmission power Ps to the target transmission power by adjusting the duty of the output voltage of the inverter 220.

The duty of the output voltage of the inverter 220 is defined as the ratio of a duration where a positive (or negative) voltage is being output to the period of the output voltage waveform (rectangular waveform). The duty of the inverter's output voltage may be adjusted by changing the operation timing of a switching element (having an on/off period ratio of 0.5) provided in the inverter 220.

Further, the power supply ECU 250 is configured to perform an operating point search control during the transmission of power to the power reception device 20. The operating point search control will be described in detail later.

The communication unit 260 is configured to wirelessly communicate with a communication unit 370 of the power reception device 20. The communication unit 260 exchanges information related to the start/stop of power transmission with the power reception device 20 or receives from the power reception device 20 information indicating the amount of power received by the power reception device 20 from the power transmission device 10 (hereinafter also referred to as "reception power Pr").

Hereinafter, the power reception device 20 will be described. The power reception device 20 includes a power reception unit 310, a filter circuit 320, a rectification unit 330, a relay circuit 340, and a power storage device 350. The power reception device 20 further includes a charging ECU 360, a communication unit 370, a voltage sensor 380, and a current sensor 382.

The power reception unit 310 receives the (AC) power output from the power transmission unit 240 of the power transmission device 10 in a wireless manner through a magnetic field. The power reception unit 310 includes, for example, a resonance circuit (not shown) for receiving power in a wireless manner from the power transmission unit 240. The resonance circuit may be constituted by a coil and a capacitor. However, if a desired resonance may be formed by the coil alone, the capacitor may be dispensed with.

The fitter circuit 320 is provided between the power reception unit 310 and the rectification unit 330, and is configured to suppress harmonic noise generated when the power reception unit 310 receives power. The filter circuit 320 may be constituted by an LC filter including an inductor and a capacitor, for example. The rectification unit 330 rectifies the AC power received by the power reception unit 310 and outputs the rectified power to the power storage device 350. The rectification unit 330 is constituted by a smoothing capacitor and a rectifier.

The power storage device 350 is a rechargeable direct current power source, and includes a secondary battery such as a lithium-ion battery or a nickel-metal hydride battery. The power storage device 350 is configured to store the power output from the rectification unit 330 and supply the stored power to a load driving device or the like (not shown). Note that an electric double-layer capacitor or the like may be used as the power storage device 350.

The relay circuit 340 is provided between the rectification unit 330 and the power storage device 350. The relay circuit 340 is turned on (or brought into conduction) when the power storage device 350 is to be charged by the power transmission device 10. The voltage sensor 380 detects a voltage output from the rectification unit 330 (the voltage of the power to be received), and outputs the detected value to the charging ECU 360. The current sensor 382 detects a current output from rectification unit 330 (the current of the power to be received), and outputs the detected value to the charging ECU 360. The voltage sensor 380 and the current sensor 382 may be provided between the power reception unit 310 and the rectification unit 330 (for example, between the filter circuit 320 and the rectification unit 330).

The charging ECU 360 includes a CPU, a memory, an input/output port and the like (none of which is shown), and is configured to receive a signal from each sensor mentioned above and perform a control on various units provided in the power reception device 20. Note that the control is not necessarily processed by software, it may be processed by dedicated hardware (such as an electronic circuit). The charging ECU 360 detects (calculates) the reception power Pr based on the detection values of the voltage sensor 380 and the current sensor 382.

The communication unit 370 exchanges information related to the start/stop of power transmission with the power transmission device 10 or sends information indicating the detected (calculated) amount of the reception power Pr to the power transmission device 10 according to an instruction sent from the charging ECU 360.

According to the power transfer system, in the power transmission device 10, the AC transmission power Ps is supplied from the inverter 220 through the filter circuit 230 to the power transmission unit 240. Each of the power transmission unit 240 and the power reception unit 310 includes a resonance circuit which is configured to resonate at the frequency of the transmission power Ps.

When the AC power is supplied from the inverter 220 through the filter circuit 230 to the power transmission unit 240, a magnetic field is formed between a coil constituting the resonance circuit of the power transmission unit 240 and a coil constituting the resonance circuit of the power reception unit 310, and thereby, the energy (or power) is transferred from the power transmission unit 240 to the power reception unit 310 through the magnetic field. The energy (or power) transferred to the power reception unit 310 is supplied to the power storage device 350 through the filter circuit 320 and the rectification unit 330.

Figure 3:
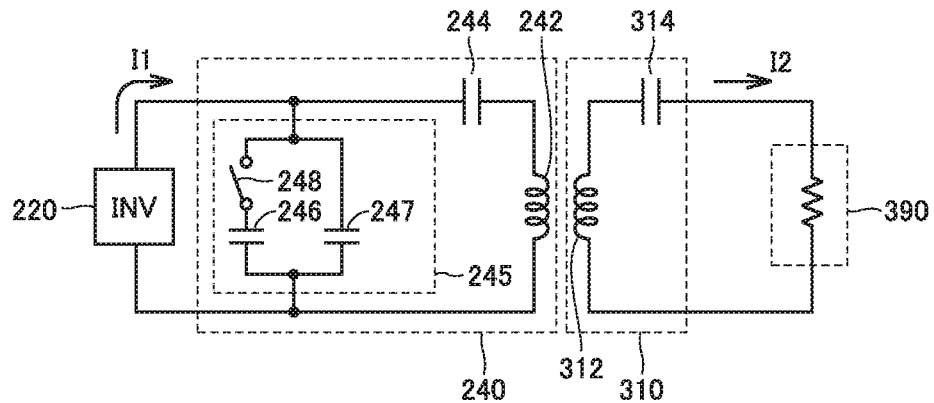
FIG. 3 is a circuit diagram illustrating the configuration of a power transmission unit and a power reception unit.

FIG. 3 is a circuit diagram illustrating the configuration of the power transmission unit 240 and the power reception unit 310 that are illustrated in FIG. 2. The power transmission unit 240 includes a power transmission coil 242, a capacitor 244, and a variable capacitance unit 245. The capacitor 244 is connected in series to the power transmission coil 242. The variable capacitance unit 245 is connected hi parallel to the power transmission coil 242. In the circuit diagram, the filter circuit 230 (see FIG. 2) between the inverter 220 and the power transmission unit 240 in the power transmission device 10 is not shown.

The variable capacitance unit 245 includes capacitors 246 and 247 that are connected in parallel and a switch 248 that is connected in series to the capacitor 246. The switch 248 is turned on or off according to a control signal from the power supply ECU 250.

The capacitor 244 and the variable capacitance unit 245 are provided to Elitist the resonance frequency of the power transmission unit 240. Since the switch 248 may be appropriately controlled by the charging ECU 360, it is possible to discretely adjust the capacitance of the variable capacitance unit 245, and consequently, it is possible to discretely adjust the resonance frequency. In some embodiments a Q value indicating the resonance intensity of the resonance circuit constituted by the power transmission coil 242, the capacitor 244 and the variable capacitance unit 245 is 100 or more.

The variable capacitance unit 245 is not limited to that illustrated in FIG. 3. For example, the variable capacitance unit 245 may be a variable capacitor with a capacitance that may be continuously varied according to a control signal from the charging ECU 360.

The power reception unit 310 includes a power reception coil 312 and a capacitor 314. The capacitor 314 is connected in series to the power reception coil 312 to form a resonance circuit with the power reception coil 312. The capacitor 314 is provided to adjust the resonance frequency of the power reception unit 310. In some embodiments, the Q value of the resonance circuit constituted by the power reception coil 312 and the capacitor 314 is 100 or more.

The filter circuit 320, the rectification unit 330 and the power storage device 350 after the power reception unit 310 (FIG. 2) are collectively represented by an electric load 390.

<Operating Point Search Control>

In the configuration as described above, the power supply ECU 250 is configured to perform a control (hereinafter referred to as an operating point search control) during the transmission of power to the power reception device 20 by altering the driving frequency f of the inverter 220, the capacitance of the variable capacitance unit 245 and the like (hereinafter collectively referred to as an operating point of the inverter 220 or an operating point of power transmission device 10 or simply referred to as an operating point) so as to search for an optimal operating point at which the power transmission efficiency for transmitting power to the power reception device 20 (power transmission of between the power transmission coil 242 and the power reception coil 312) is optimal and cause the inverter 220 to operated at the searched optimal operating point.

For example, the power supply ECU 250 alters the operating point of the inverter 220, receives the reception power Pr from the power reception device 20 during the alteration of operating point, searches for an operating point at which the reception power Pr is maximum as the optimal operating point. The above-described search method is merely an example, and the present disclosure is not limited thereto. For example, when the power transmission efficiency is inversely proportional to the square of the current Is flowing through the power transmission coil 242, the power transmission device 10 may be configured to alter the operation point, and set an operating point at which the current Is during the alteration of operating point as the optimal operating point.

<Setting of Transmission Power Ps>

The power transmission efficiency for transmitting power in a wireless manner from the power transmission device 10 to the power reception device 20 may be varied by various factors. The factors include initial factors that are fixed at the initial state when the power transmission is started and will maintain substantially invariable during the one-time power transmission (such as the variation of parts included in the system or the relative position of the power reception device to the power transmission device) and variable factors that may vary actively during the one-time power transmission (such as the operating point of the it of the power transmission device 10).

Figure 4:
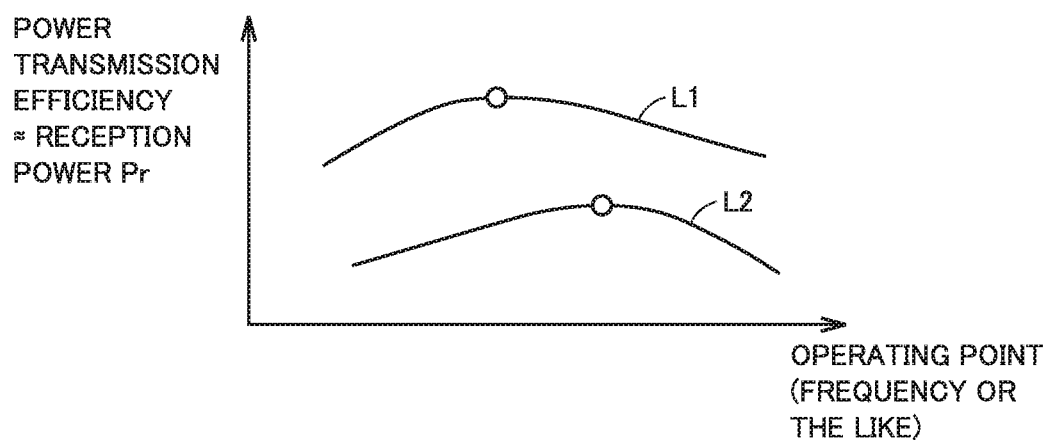
FIG. 4 is a diagram schematically illustrating an exemplary correlation between the operating point and the power transmission efficiency when the transmission power Ps is constant.

FIG. 4 is a diagram schematically illustrating an exemplary correlation between the operating point and the power transmission efficiency when the transmission power Ps is constant. In FIG. 4, the horizontal axis indicates an operating point of the inverter 220 (such as the driving frequency for the capacitance), and the vertical axis indicates the power transmission efficiency. When the transmission power Ps is constant, the power transmission efficiency is approximately proportional to the reception power Pr.

Curves L1 and L2 in FIG. 4 represent different correlation when the initial factors (such as the variation of parts and the relative position of the power reception device 20) are different. It is understandable from FIG. 4, that the correlation between the operation point and the power transmission efficiency differs in accordance with the initial factors, and that when the initial factors are fixed, the power transmission efficiency (≈the reception power Pr) differs in accordance with the operating point. It is also understandable that the operating point at which the power transmission efficiency is maximum differs in accordance with the initial factors.

Therefore, if the power transmission is started when the initial factors are determined (i.e., after the vehicle 1 is aligned such that the power reception device 20 of the vehicle 1 faces the power transmission device 10) while the variable factors are not determined (the operating point is not determined after the operating point search control is completed), the power transmission efficiency is not fixed. Therefore, even if the transmission power Ps is set to a large value dose to the maximum output of the power transmission device 10 at the start of power transmission, the power transmission efficiency may become equal to the maximum efficiency depending on the combination of the initial factors and the variable factors, and as a result, the reception power Pr may become very large (become equal to the product of an amount of power close to the maximum output of the power transmission device 10 and the maximum efficiency) which makes it necessary to design an allowable reception Power of the power reception device 20 to a very large value. As a result, the size and cost of the power reception device 20 may increase adversely.

Therefore, the power supply ECU 250 according to the present embodiment sets the transmission power Ps to a first power P1 lower than the maximum output of the power transmission device 10 when the transmission of power to the power reception device 20 is started. Then, the power supply ECU 250 performs the above-mentioned operating point search control while the transmission power Ps is being set to the first power P1. If the reception power Pr is equal to or higher than the target reception power after the operating point search control is completed, the power supply ECU 250 maintains the transmission power Ps at the first power P1. On the other hand, if the reception power Pr is lower than the target reception power after the operating point search control is completed, the power supply ECU 250 sets the transmission power Ps to a second power P2 higher than the first power P1. Note that the second power P2 is lower than the maximum output of the power transmission device 10. Therefore the relationship between the first power P1, the second power P2 and the maximum output of the power transmission device 10 satisfies P1<P2<the maximum output.

Figure 5:
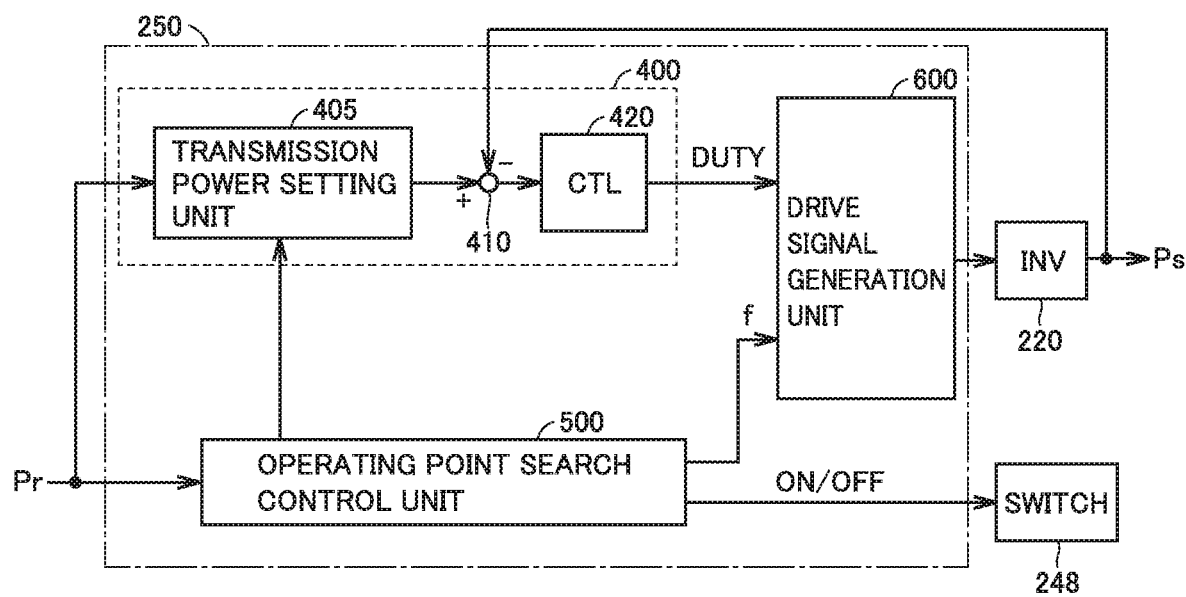
FIG. 5 is a schematic control block diagram of a power supply ECU.

FIG. 5 illustrates a schematic control block diagram of the power supply ECU 250. The power supply ECU 250 includes a power control unit 400 configured to control the transmission power Ps, an operating point search control unit 500 configured to perform the above-described operating point search control, and a drive signal generation unit 600 configured to generate a drive signal for the inverter 220.

The power control unit 400 includes a transmission power setting unit 405, a subtraction unit 410, and a controller 420.

The transmission power setting unit 405 sets the target transmission power indicating the target amount of the transmission power Ps to either the first power P1 or the second power P2. As described above, the first power P1 is lower than the maximum, output of the power transmission device 10 and the second power P2. The method of setting the target transmission power will be described in detail later.

The subtraction unit 410 calculates a difference between the target transmission power set by transmission power setting unit 405 and the transmission power Ps (by subtracting the transmission power Ps from the target transmission power), and outputs the calculation result to the controller 420. As described above, the transmission power Ps is detected (calculated) based on the detection values of the voltage sensor 270 and the current sensor 272 illustrated in FIG. 2.

The controller 420 generates a duty command value DUTY for the output voltage of the inverter 220 based on the difference between the target transmission power and the transmission power Ps, and outputs it to the drive signal generation unit 600. For example, the controller 420 performs a proportional integration (PI) control using the difference between the target transmission power and the transmission power Ps (i.e., the output from the subtraction unit 410) as an input to calculate a manipulation variable for bringing the difference close to zero, and uses the calculated manipulation variable as the duty command value DUTY. Thus, the transmission power Ps is maintained at the target transmission power (either the first power P1 or the second power P2) via feedback control.

When the transmission of power to the power reception device 20 is started, the transmission power setting unit 405 sets the target transmission power to the first power P1. Thereby, at the start of power transmission, the transmission power Ps is maintained at the first power P1 (which is lower than the maximum output of the power transmission device 10 and the second power P2) via feedback control.

When the transmission of power to the power reception device 20 is started, the operating point search control unit 500 performs the above-described operating point search control while the transmission power Ps is being maintained at the first power P1 via feedback control. Specifically, the operating point search control unit 500 firstly alters the operating point (the driving frequency f, the capacitance) while the transmission power Ps is being set to the first power P1. For example, the operating point search control unit 500 alters the driving frequency f from the minimum value fmin to the maximum value fmax by turning off the switch 248 so as to remove the capacitor 246 of the variable capacitance unit 245 from the inverter 220, and then, alters the driving frequency f from the minimum value fmin to the maximum value fmax after the capacitance of the variable capacitance unit 245 is increased by turning on the switch 248 so as to connect the capacitor 246 to the inverter 220.

The operating point search control unit 500 receives the reception, power Pr from the power reception device 20 during the alteration of operating point, and stores it in the memory. After the alteration of operating point is completed, the operating point search control unit 500 searches for an operating point at which the reception power Pr is maximum, and sets the searched operating point as the optimal operating point. As described above, the method for searching an optimal operating point is not limited to that described above.

Then, the operating point search control unit 500 causes the inverter 220 to operate at the optimal operating point. Specifically, the driving frequency f serving as the optimal operating point is output to the drive signal generation unit 600 so as to cause the inverter 220 to operate at the optimal operating point, and the switch 248 is controlled to adjust the capacitance of the variable capacitance unit 245 so as to achieve the optimal operating point. Thus, the operating point search control is completed.

After the operating point search control is completed, the operating point search control unit 500 sends a search completion signal to the transmission power setting unit 405. Meanwhile, after the operating point search control is completed, the operating point search control unit 500 also sends a search completion signal to the power reception device 20 via the communication unit 260. The power reception device 20 is configured to send the amount of the reception power Pr to the power transmission device 10 in response to the reception of a search completion signal from the power transmission device 10.

The transmission power setting unit 405 is configured to obtain the reception power Pr from the power reception device 20 after the operating point search control is completed, and compare the reception power Pr obtained after the operating point search control is completed with the target reception power. The target reception power may be stored in advance in the power transmission device 10 or may be set in the power reception device 20 and received from the power reception device 20.

If the reception power Pr is equal to or higher than the target reception power after the operating point search control is completed, the transmission power setting unit 405 maintains the target transmission power at the first power P1. Thereby, the transmission power Ps is maintained at the first power P1. On the other hand, if the reception power Pr is lower than the target reception power after the operating point search control is completed, the target transmission power is set to the second power P2 higher than the first power P1. Thereby, the transmission power Ps is increased from the first power P1 to the second power P2.

Figure 6:
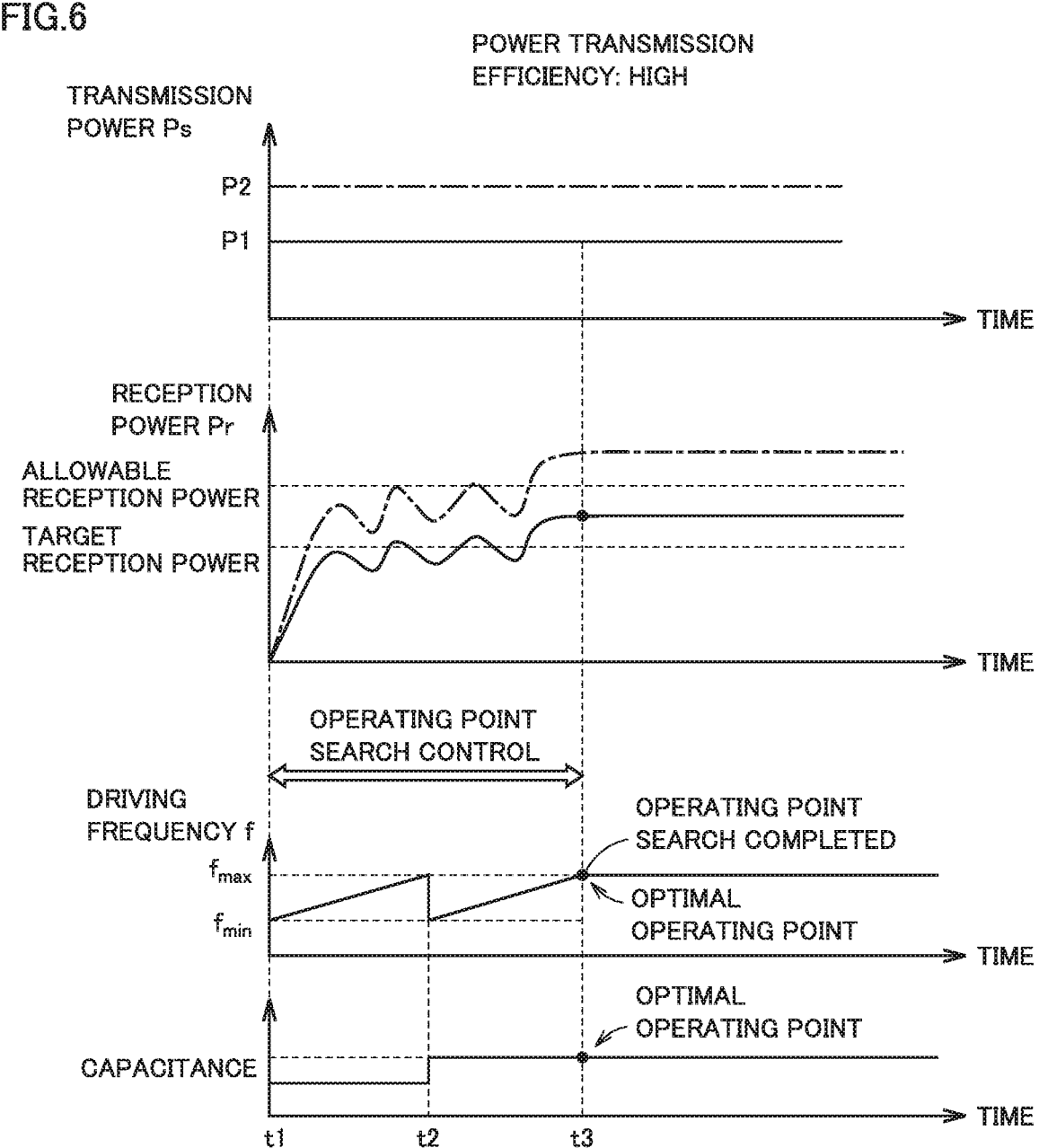
FIG. 6 is a diagram (example 1) schematically illustrating, variations on a transmission power Ps, a reception power Pr, a driving frequency f and a capacitance at the start of power transmission.

FIG. 6 is a diagram schematically illustrating variations on the transmission power Ps, the reception power Pr, the driving frequency f, and the capacitance at the start of power transmission in a case where the transmission power Ps is maintained at the first power P1 even after the operating point search control is completed.

The transmission of power from the power transmission device 10 to the power reception device 20 is started at time t1 where the alignment of the vehicle 1 is completed (the initial factor is determined). At the start of power transmission, the transmission power Ps is set to the first power P1. Then, the operating point search control is performed during the period of time t1 to t3 while the transmission power Ps is being set to the first power P1. As illustrated by the example in FIG. 6, during the period of time t1 to t2, after the capacitance is reduced by turning off the switch 248, the driving frequency f is increased from the minimum value fmin to the maximum value fmax, and then during the period of time t2 to t3, after the capacitance is increased by turning on the switch 248, the driving frequency f is increased from the minimum value fmin to the maximum value fmax.

As illustrated in FIG. 6, during the operating point search control, the power transmission efficiency fluctuates, which causes the reception power Pr to increase or decrease. After the operating point search control is completed, the inverter 220 is made to operate at the optimal operating point (the operating point at time t3 where the reception power Pr becomes largest during, the operating point search control as illustrated by the example in FIG. 6). Thus, the reception power Pr after the operating point search control is completed becomes higher than the reception power Pr when the power transmission is started.

In the present embodiment, since the operating point search control is performed while the transmission power Ps is being set to the first power P1 lower than the second power P2, it is possible to lower the reception power Pr during the operating point search control as a whole. In other words, as illustrated by the one-dot chain line in FIG. 6, if the operating point search control is performed while the transmission power Ps is being set to the second power P2 higher than the first power P1, the power reception Pr during the operating point search control becomes high as a whole. Thus, in the present embodiment, the operating point search control is performed while the transmission power Ps, is being set to the first power P1 lower than the second power P2, which makes it possible to lower the reception power Pr during the operating point search control as a whole. Thus, compared to the case where the operating point search control is performed while the transmission power Ps is being set to the second power P2, it is possible to design the allowable reception power of the power reception device 20 to a lower value, preventing the size and cost of the power reception device 20 from increasing.

After the operating point search control is completed, the inverter 220 is made to operate at the optimal operating point. As illustrated by the example in FIG. 6, during the period of time t1 to t3 where the operating point search control is performed, the operating point at time t3 where the reception power Pr becomes largest is taken as the optimal operating point. Then, as illustrated by the example in FIG.

6, at time t3, since the power transmission efficiency is high, the reception power Pr may exceed the target reception power even if the transmission power Ps is set, to the first power P1. Therefore, the transmission power Ps is maintained at the first power P1 even after time t3. As a result, it is possible to prevent the power reception power Pr from becoming unnecessarily high to exceed the allowable power reception of the power reception device 20.

Figure 7:
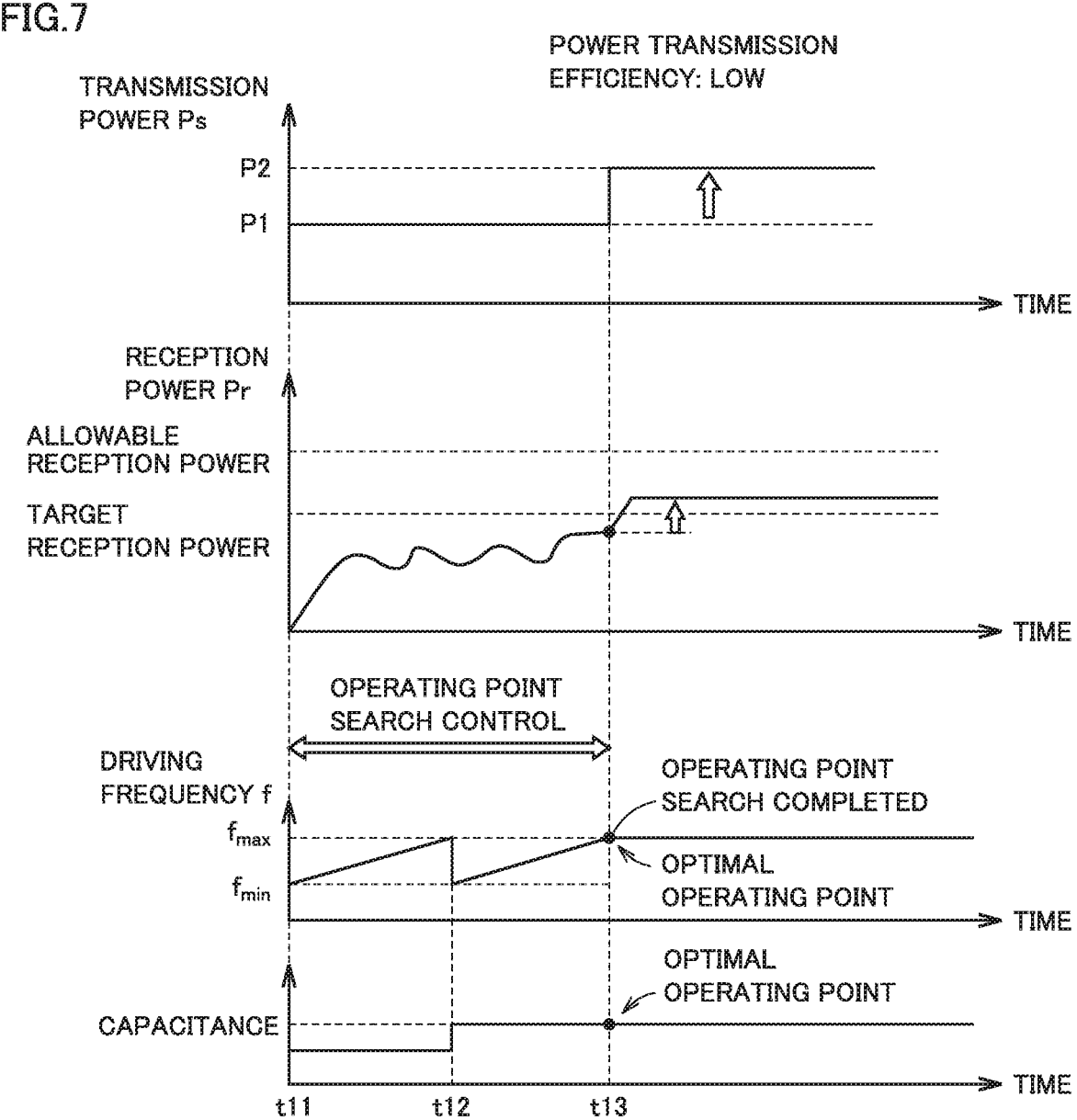
FIG. 7 is a diagram (example 2) schematically illustrating variations on the transmission power Ps, the reception power Pr, the driving frequency f, and the capacitance at the start, of power transmission.

FIG. 7 is a diagram schematically illustrating variations on the transmission power Ps, the reception power Pr, the driving frequency f, and the capacitance at the start of power transmission in a case where the transmission power Ps is increased from the first power P1 to the second power P2 at the operating point search control is completed.

Similar to the period of time t1 to t3 illustrated in FIG. 6, during the period of time t11 to t13 illustrated in FIG. 7, the transmission power Ps set to the first power P1 at the start of power transmission, and the operating point search control is performed while the transmission power Ps is being set to the first power P1, which makes it possible to lower the reception power Pr during the operating point search control as a whole. As a result, it is possible to design the allowable reception power of the power reception device 20 to a lower value, preventing the size and cost of the power reception device 20 from increasing. Similarly, as illustrated by the example in FIG. 7, during the period from time t11 to t13 where the operating point search control is performed, the operating point at time t13 where the reception power Pr becomes largest is taken as the optimal operating point.

As illustrated by the example in FIG. 7, since the power transmission efficiency is low at time t13 after the operating point search control is completed, the reception power Pr becomes lower than the tin reception power. Thus, the transmission power Ps is increased from the first power P1 to the second power P2 after time t13. Thereby, the reception power Pr may be made greater than the target reception power.

Figure 8:
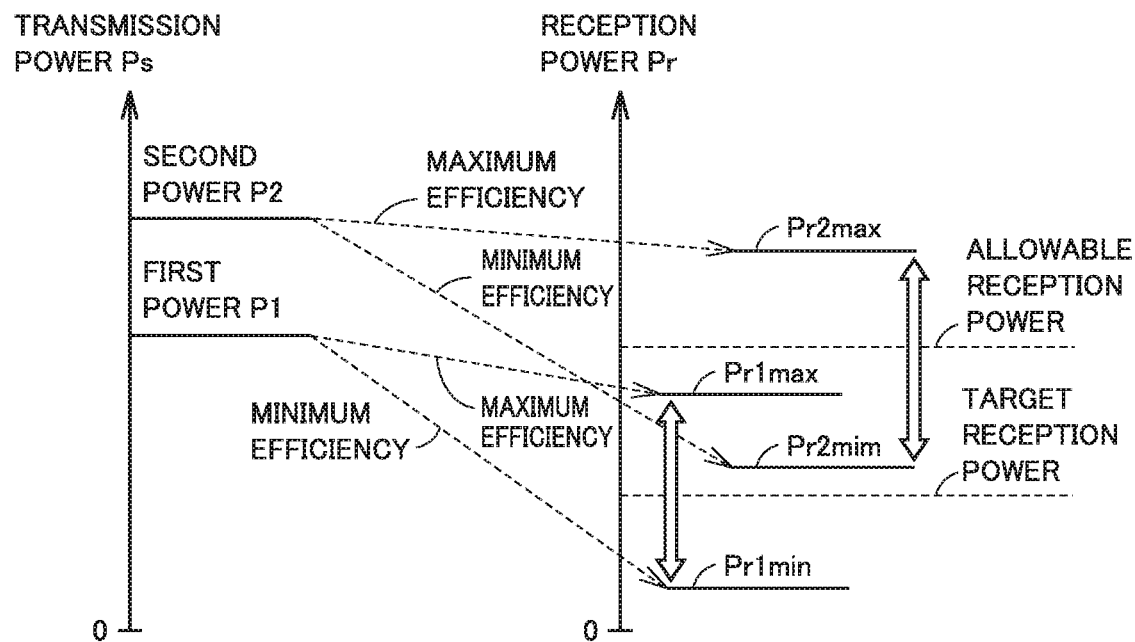
FIG. 8 is a diagram for explaining a first power P1 and a second power P2.

FIG. 8 is a diagram for explaining the first power P1 and the second power P2. In FIG. 8, "Pr1max" indicates the reception power Pr when the first power P1 is transmitted at a predetermined maximum efficiency, and "Pr1min" indicates the reception power Pr when the first power P1 is transmitted at a predetermined minimum efficiency. "Pr2max" indicates the reception power Pr when the second power P2 is transmitted at the predetermined maximum efficiency, and "Pr2min" indicates the reception power Pr when the second power P2 is transmitted at the predetermined minimum efficiency. Therefore, the range between the reception power Pr1min and the reception power Pr1max is a variation range of the reception power Pr while the transmission power Ps is being set to the first power P1, and the range between the reception power Pr2min and the reception power Pr2max is a variation range of the reception power Pr while the transmission power Ps is being set to the second power. P2.

The first power P1 is set in such a manner that the reception power Pr1max when the first power P1 is transmitted at the maximum efficiency is lower than the allowable reception power of the power reception device 20. As a result, even if the power transmission efficiency becomes equal to the predetermined maximum efficiency while the transmission power Ps is being set to the first power P1, it is possible to ensure that the reception power Pr is lower than the allowable reception power of the power reception device 20.

The second power P2 is higher than the first power P1, and is set in such a manner that the reception power Pr2min when the second power P2 is transmitted at the minimum efficiency is equal to or higher than the target reception power. As a result, even if the power transmission efficiency becomes equal to the predetermined minimum efficiency while the transmission power Ps is being set to the second power P2, it is possible to ensure that the reception power Pr is equal to or higher than the target reception power.

As long as the above conditions are satisfied, the second power P2 may be a value that is set in advance or a value that varies in response to the difference between the target reception power and the reception power Pr. When the second power P2 is a value that varies in response to the difference between the target reception power and the reception power Pr, the second power P2 may be feedforward controlled in response to the difference (for example, the second power P2=the first power P1+the difference), or the second power P2 may be feedback controlled so that the difference approaches zero.

Figure 9:
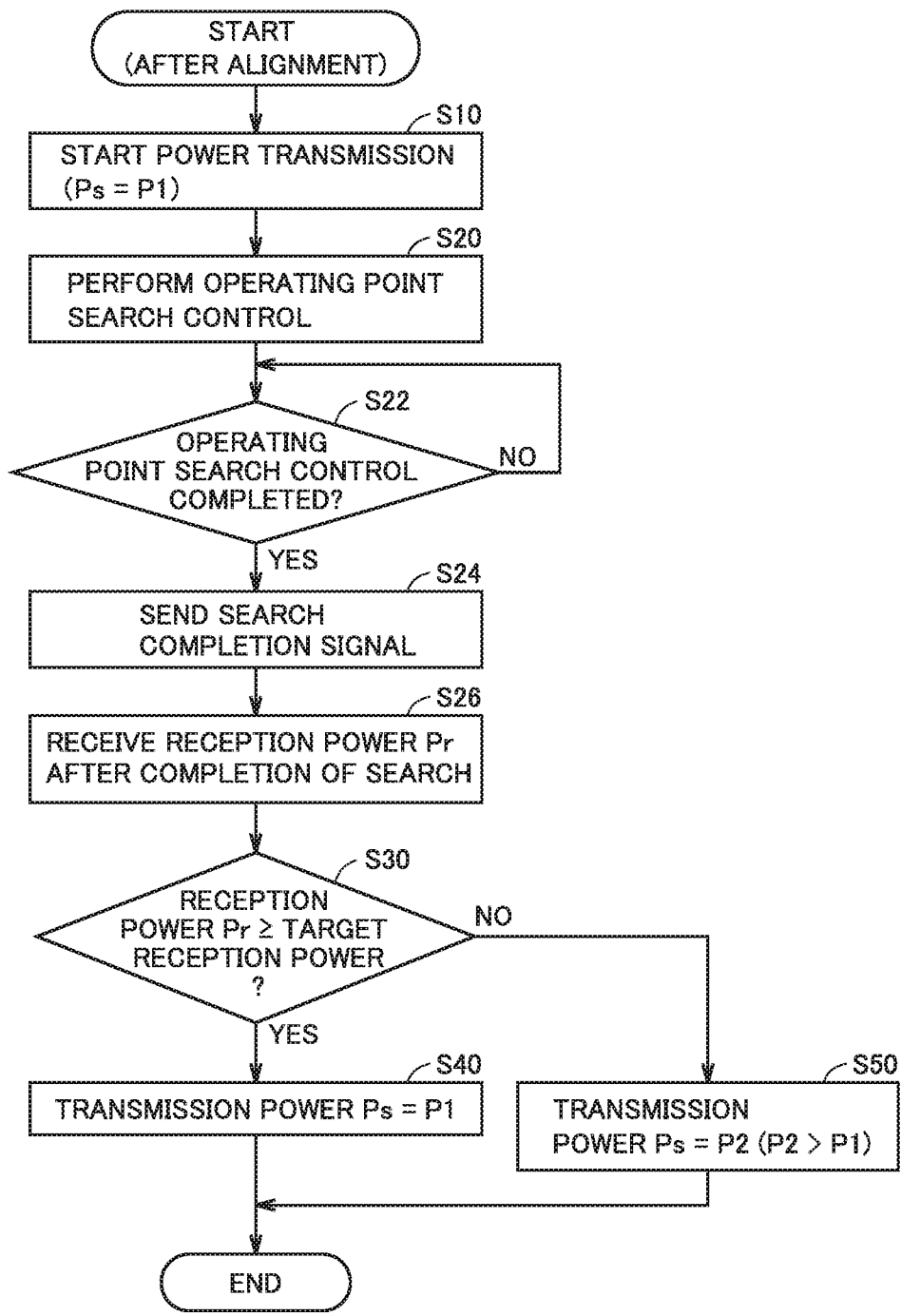
FIG. 9 is a flowchart (example 1) schematically illustrating a process per by the power supply ECU.

FIG. 9 is a flowchart schematically illustrating a process performed by the power supply ECU 250 of the power transmission device 10. The process is initiated, for example, after the vehicle 1 is aligned such that the power reception device 20 of the vehicle 1 faces the power transmission device 10.

The power supply ECU 250 sets the target transmission power to the first power P1 and starts the power transmission (step S10). Thus, the transmission power Ps at the start of the power transmission is equal to the first power P1.

The power supply ECU 250 performs the above-described operating point search control while the transmission power Ps is being set to the first power P1 (step S20).

The power supply ECU 250 determines whether or not the operating point search control is completed (step S22). If it is determined that the operating point search control is not completed (NO in step S22), the power supply ECU 250 waits until the operating point search control is completed.

If it is determined that the operating point search control is completed (YES in step S22), the power supply ECU 250 sends a search completion signal to the power reception device 20 (step S24).

Next, the power supply ECU 250 receives, from the power reception device 20, the reception power Pr after sending the search completion signal to the power reception device 20 (hereinafter also referred to as "reception power Pr after the completion of search") (step S26).

Next, the power supply ECU 250 determines whether or not the reception power Pr after the completion of search received from the power reception device 20 is equal to or higher than the target reception power (step S30). If it is determined that the reception power Pr after the completion of search is equal to or higher than the target reception power (YES in step S30), the power supply ECU 230 sets the target transmission power to the first power P1 (step S40). Thus, the transmission power Ps is maintained at the first power P1. On the other hand, if it is determined that the reception power Pr after the completion of search is lower than the target reception power (NO in step S30), the power supply ECU 250 sets the target transmission power to the second power P2 (step S50). Thus, the transmission power Ps is increased from the first power P1 to the second power P2.

As described above, the power supply ECU 250 of the power transmission device 10 according to the present embodiment sets transmission power Ps to the first power P1 lower than the second power P2 at the start of power transmission, and performs the operating point search control in that state. Thus, compared to the case where the operating point search control is performed while the transmission power Ps is being set to the second power P2, it is possible to lower the reception power during the operating point search control, which makes it possible to design the allowable reception power of the power reception device 20 to a lower value, preventing the size and cost of the power reception device 20 from increasing. After the operating point search control is completed (after the power transmission efficiency is determined), if the reception power Pr is lower than the target reception power, the transmission power Ps is increased from the first power P1 to the second power P2. Thereby, the reception power Pr may be brought close to the target reception power. As a result, it is possible to transmit an appropriate amount of power in a wireless manner from the power transmission device 10 to the power reception device 20 while preventing the size and cost of the power reception device 20 from increasing.

Further, the first power P1 is set in such a manner that the reception power Pr1max when the first power P1 is transmitted at the maximum efficiency is lower than the allowable reception power of the power reception device 20. As a result, even if the power transmission efficiency becomes equal to the predetermined maximum efficiency while the transmission power Ps is being set to the first power P1, it is possible to ensure that the reception power Pr is lower than the allowable reception power of the power reception device 20. Furthermore, the second power P2 is set in such a manner that the reception power Pr2min when the second power P2 is transmitted at the minimum efficiency is equal to or higher than the target reception power. As a result, even if the power transmission efficiency becomes equal to the predetermined minimum efficiency while the transmission power Ps is being set to the second power P2, it is possible to ensure that the reception power Pr is equal to or higher than the target reception power.

Furthermore, the power supply ECU 250 of the power transmission device 10 sends a search completion signal to the power reception device 20 after the operating point search control is completed, and if the amount of the reception power Pr received from the power reception device 20 after the search completion signal is sent is lower than the amount of the target reception power, the power supply ECU 250 increases the transmission power Ps from the first power P1 to the second power P2. Therefore, it is possible to transmit an appropriate amount of power according to the actual power transmission efficiency.

Further, the power reception device 20 is configured to send the amount of the reception power Pr to the power transmission device 10 in response to the reception of a search completion signal from the power transmission device 10. Therefore, the power reception device 20 may send to the power transmission device 10 the amount of the reception power Pr that is transmitted at a power transmission efficiency after the initial factors and the variable factors are determined. Therefore, the power transmission device 10 may set the transmission power Ps in relation to the actual amount of the reception, power Pr after the power transmission efficiency is determined. As a result, it is possible to transmit an appropriate amount of power in a wireless manner from the power transmission device 10 to the power reception device 20.

Second Embodiment

In the first embodiment described above, based on the fact that the power transmission efficiency for transmitting power in a wireless manner may not be determined unless the operating point search control is performed while the power is being actually transmitted, the operating point search control is performed while the transmission power Ps is being lowered to the first power P1 in advance, which makes it possible to lower the reception power Pr during the operating point search control.

In the second embodiment, based on the fact that the power transmission efficiency in a wireless manner is greatly affected by the initial factors rather than the variable factors, the power transmission efficiency is estimated based on the relative, position of the power reception device 20 to the power transmission coil 242 of the power transmission device 10 (i.e., the initial factor) before the start of power transmission, and whether the power transmission power Ps is set to the first power P1 or the second power P2 at the start of power transmission is determined based on the estimated power transmission efficiency (hereinafter also referred to as "anticipation efficiency").

In the following, the calculation of the anticipation efficiency will be described. Firstly, the position of the horizontal center (central axis) of the power reception coil 312 relative to the horizontal center (central axis) of the power transmission coil 242 is detected as the relative position of the power reception coil 312 by using the camera 280, and then, the anticipation efficiency is calculated based on the detected relative position of the power reception coil 312.

Figure 10:
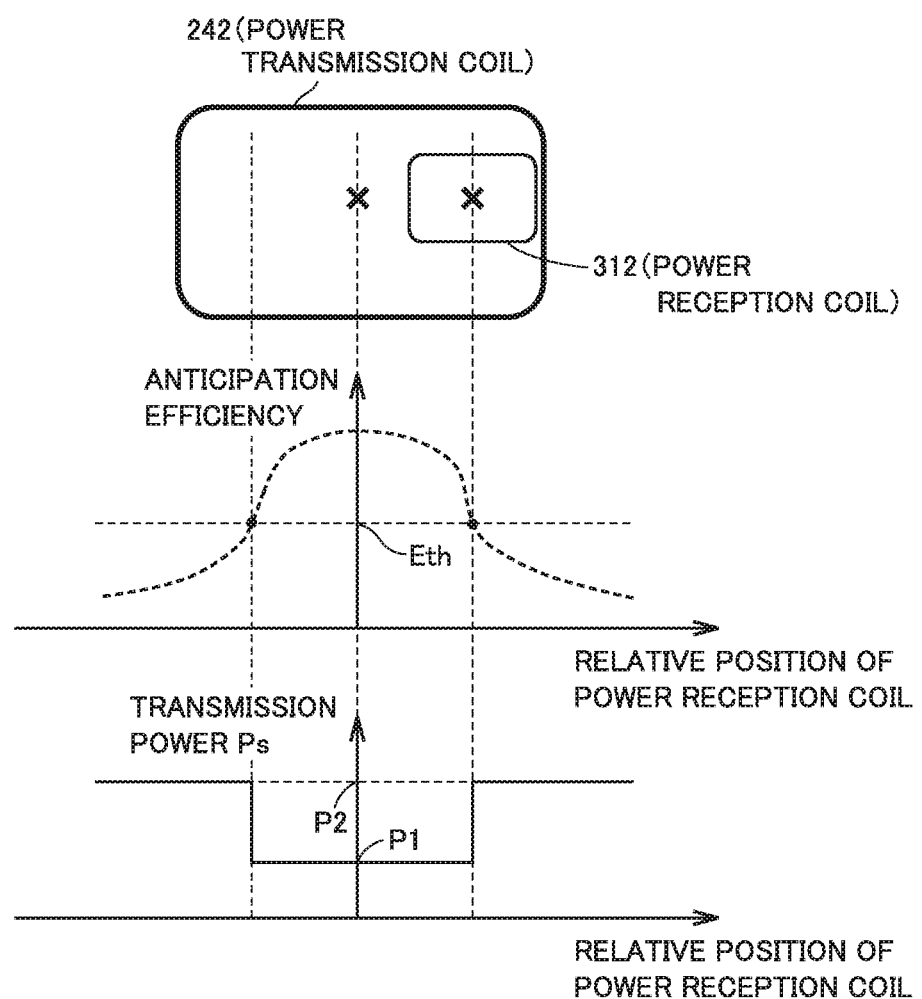
FIG. 10 is a diagram schematically illustrating an exemplary correlation between the relative position of the power reception device, the anticipation efficiency and the transmission power Ps.

FIG. 10 is a diagram schematically illustrating an exemplary correlation between the relative position of the power reception device 20, the anticipation efficiency and the transmission power Ps.

Generally, when the central axis of the power reception coil 312 is positioned near the central axis of the power transmission coil 242, the power transmission efficiency is maximum, and as the central axis of the power reception coil 312 deviates from the central axis of the power transmission coil 242, the power transmission efficiency decreases gradually.

Thus, before starting the power transmission, the power supply ECU 250 detects the relative position of the power reception coil 312 based on an image photographed by the camera 280, and calculates the anticipation efficiency based on the detected relative position. Specifically, the correlation between the relative position of the power reception coil 312 and the anticipation efficiency as illustrated in FIG. 10 is stored in advance in the memory of the power supply ECU 250. The power supply ECU 250 calculates the anticipation efficiency corresponding to the relative position detected by the camera 280 with reference to the correlation stored in the memory.

If the anticipation efficiency is equal to or higher than a threshold Eth, the power supply ECU 250 sets the transmission power Ps to the first power P1 at the start of power transmission, and if the anticipation efficiency is smaller than the threshold Eth, the power supply ECU 250 sets the transmission power Ps to the second power P2 at the start of power transmission.

Figure 11:
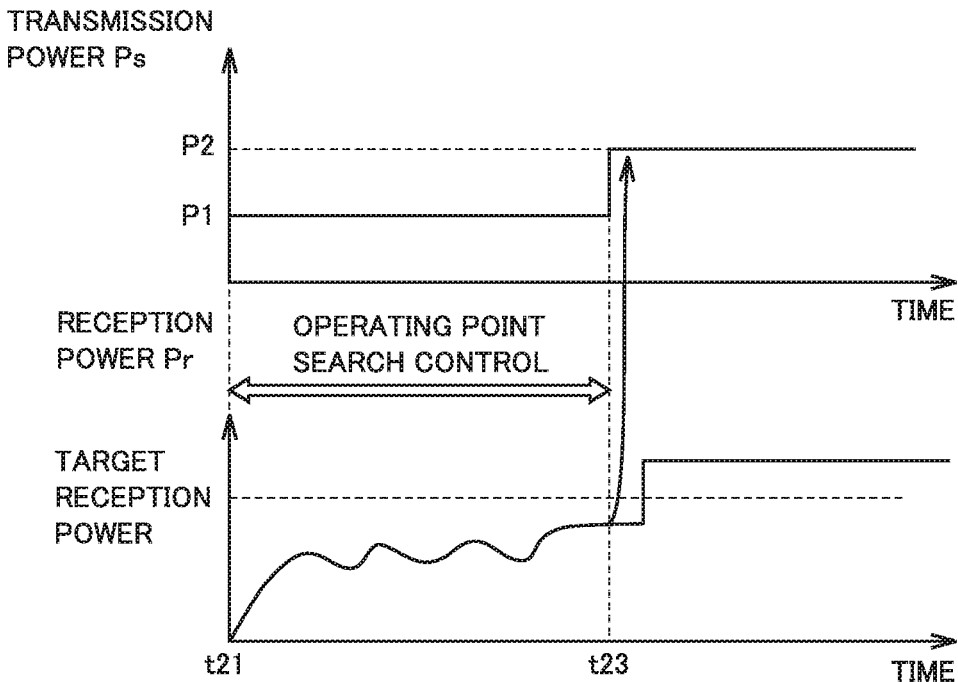
FIG. 11 is a diagram schematically illustrating variations on the transmission power Ps and the reception power Pr at the start of power transmission.

FIG. 11 is a diagram schematically illustrating variations on the transmission power Ps and the reception power Pr at the start of power transmission according to the second embodiment. As illustrated by the example in FIG. 11, since the anticipation efficiency which is calculated based on the relative position detected by the camera 280 at time t21 before the start of power transmission is greater than the threshold Eth, the transmission power Ps is set to the first power P1 at the start of power transmission. Thus, it is possible to lower the reception power Pr at the start of power transmission, which makes it possible to design the allowable reception power of the power reception device 20 to a lower value, preventing the size and cost of the power reception device 20 from increasing.

During the period of time t21 to t23, the operating point search control is performed. During the operating point search control, the power transmission efficiency fluctuates, which causes the reception power Pr to increase or decrease.

As illustrated by the example in FIG. 11, since the power transmission efficiency is low at time t23 after the operating point search control is completed, the reception power Pr becomes lower than the target reception power. Thus, the transmission power Ps is increased from the first power P1 to the second power P2 after time t23. Thereby, the reception power Pr is made greater than the target reception power.

However, if the anticipation efficiency is smaller than the threshold Eth, the power transmission is started at the second power P2 higher than the first power P1, Thus, the reception power Pr is made greater at the start of power transmission. As a result, it is possible to transmit an appropriate amount of power in a wireless manner from the power transmission device 10 to the power reception device 20 while preventing the size and cost of the power reception device 20 from increasing.

Figure 12:
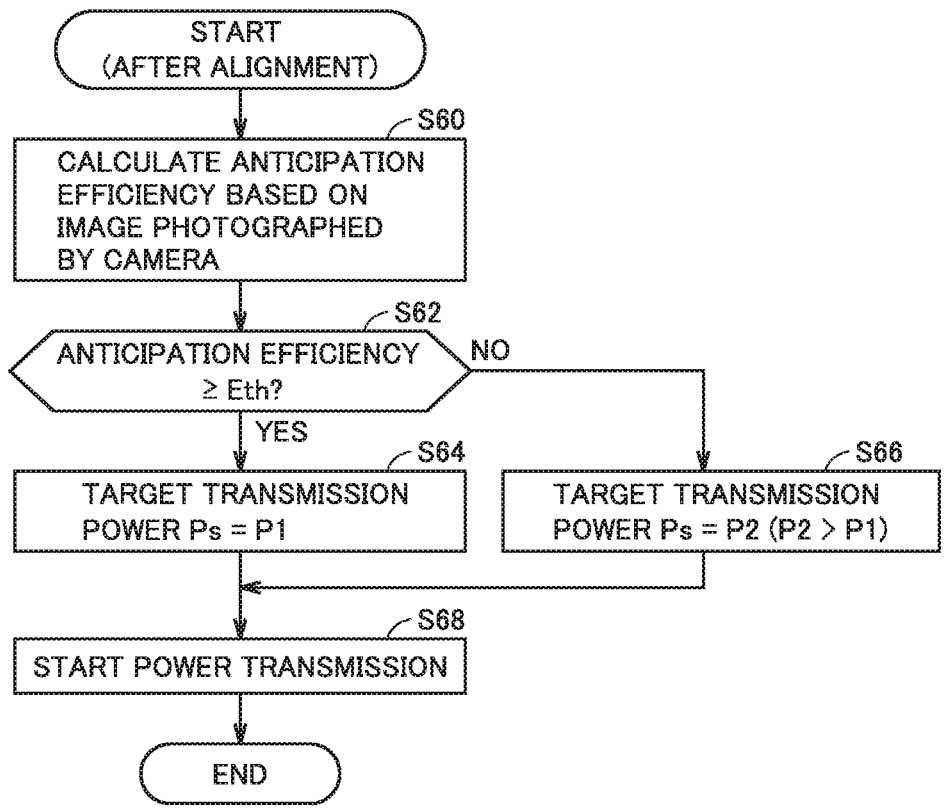
FIG. 12 is a flowchart (example 2) schematically illustrating a process performed by the power supply ECU.

FIG. 12 is a flowchart schematically illustrating a process performed by the power supply ECU 250 of the power transmission device 10 according to the second embodiment. The process is initiated, for example, after the vehicle 1 is aligned such that the power reception device 20 of the vehicle 1 faces the power transmission device 10.

The power supply ECU 250 detects the relative position of the power reception coil 312 based on an image photographed by the camera 280, and calculates the anticipation efficiency based on the detected relative position (step S60). As described above, the power supply ECU 250 calculates the anticipation efficiency corresponding to the relative position detected by the camera 280 with reference to the correlation between the relative position of the power reception coil 312 and the anticipation efficiency stored in the memory.

The power supply ECU 250 determines whether or not the anticipation efficiency is equal to or higher than the threshold Eth (step S62).

If it is determined that the anticipation efficiency is equal to or higher than the threshold Eth (YES in step S62), the power supply ECU 250 sets the target power to the first power P1 (step S64). On the other hand, if it is determined that the anticipation efficiency is smaller than the threshold Eth (NO in step S62), the power supply ECU 250 sets the target transmission power to the second power P2 (step S66).

Next, the power supply ECU 250 starts the power transmission with the target transmission power set in step S64 or the target transmission power set in step S66 (step S68).

As described above, the power supply ECU 250 of the power transmission device 10 according to the present embodiment calculates the anticipation efficiency based on the relative position of the power reception device 20 to the power transmission coil 242 before the start of power transmission. If the calculated anticipation efficiency is equal to or higher than the threshold Eth, the power transmission is started with the first power P1 lower than the second power P2. Thus, the reception power Pr is increased at the start of power transmission. As a result, it is possible to transmit an appropriate amount of power in a wireless manner from the power transmission device 10 to the power reception device 20 while preventing the size and cost of the power reception device 20 from increasing. On the other hand, if the anticipation efficiency calculated is smaller than the threshold Eth, the power transmission is started with the second power P2 higher than the first power P1. Thus, the reception power Pr is increased at the start of power transmission. As a result, it is possible to transmit an appropriate amount of power in a wireless manner from the power transmission device 10 to the power reception device 20 while preventing the size and cost of the power reception device 20 from increasing.

Although the present disclosure has been described and illustrated in detail, it is clearly understood that the same is by way of illustration and example only and is not to be taken by way of limitation, the scope of the present disclosure being interpreted by the terms of the appended claims.

What is claimed is:

1. A power transmission device comprising:
a power transmission coil configured to transmit power in a wireless manner to a power reception devices;
an inverter configured to generate an AC transmission power and supply the transmission power to the transmission coil; and
a controller configured to control the inverter so as to control the transmission power,
the controller being configured to perform an operating point search control, the operating point search control being a control to search for an optimal operating point at which a power transmission efficiency for transmitting power to the power reception device is optimal by altering an operating point of the inverter during the transmission of power to the power reception device, and cause the inverter to operate at the searched optimal operating point,
the controller being configured to
set the transmission power to a first power when the transmission of power to the power reception device is started,
perform the operating point search control while the transmission power is being set to the first power,
maintain the transmission power at the first power if a reception power received by the power reception device is equal to or higher than a target reception power after the operating point search control is completed, and
set the transmission power to a second power which is higher than the first power if the reception power is lower than the target reception power after the operating point search control is completed.

2. The power transmission device according to claim 1, wherein
the first power is set in such a manner that when the first power is transmitted at a predetermined maximum efficiency, the reception power is lower than an allowable reception power of the power reception device, and
the second power is set in such a manner that when the second power is transmitted at a predetermined minimum efficiency, the reception power is equal to or higher than the target reception power.

3. The power transmission device according to claim 1, wherein
the power transmitting device further includes a communication device configured to communicate with the power reception device,
the controller is configured to
send a search completion signal to the power reception device when the operating point search control is completed, and set the transmission power to the second power if the amount of the reception power received from the power reception device is lower than the amount of the target reception power after the search completion signal is sent.

4. A power reception device comprising:
a power reception coil configured to receive power transmitted from a power transmission device in a wireless manner;
a communication device configured to communicate with the power transmission device; and
a controller configured to calculate a reception power received by the reception coil,
the controller sending the amount of the reception power to the power transmission device in response to the reception of a search completion signal from the power transmission device,
the search completion signal being sent from the power transmission device when an operating point search control is completed in the power transmission device, the operating point search control being a control to search for an operating point at which the power transmission efficiency for transmitting power from the power transmission device to the power reception coil is optimal.

5. A control method for a power transmission device, the power transmission device including
a power transmission coil configured to transmit power in a wireless manner to a power reception device, and
an inverter configured to generate an AC transmission power and supply the transmission power to the transmission coil,
the control method comprising:
setting the transmission power to a first power when the transmission of power to the power reception device is started;
performing an operating point search control while the transmission power is being set to the first power;
maintaining the transmission power at the first power if a reception power received by the power reception device is equal to or higher than a target reception power after the operating point search control is completed; and
setting the transmission power to a second power which is higher than the first power if the reception power is lower than the target reception power after the operating point search control is completed,
the operating point search control being a control to search for an optimal operating point at which a power transmission efficiency for transmitting power to the power reception device is optimal by altering an operating point of the inverter during the transmission of power to the power reception device, and cause the inverter to operate at the searched optimal operating point.

6. A power transmission device comprising:
a power transmission coil configured to transmit power in a wireless manner to a power reception device;
an inverter configured to generate an AC transmission power and supply the transmission power to the transmission coil; and a controller configured to control the inverter so as to control the transmission power,
the controller being configured to
estimate a power transmission efficiency for transmitting power to the power reception device based on a relative position of the power reception device to the power transmission coil before transmitting power to the power reception device,
set the transmission power to a first power if the estimated power transmission efficiency is equal to or greater than a threshold,
set the transmission power to a second power which is higher than the first power if the estimated power transmission efficiency is smaller than the threshold, and
start transmitting the set transmission power to the power reception device.

7. The power transmission device according to claim 6, wherein
the first power is set in such a manner that when the first power is transmitted at a predetermined maximum efficiency, a reception power received by the power reception device is lower than an allowable reception power of the power reception device, and
the second power is set in such a manner that when the second power is transmitted at a predetermined minimum efficiency, the reception power is equal to or higher than a target reception, power.

8. The power transmission device according to claim 6, wherein
the power transmission device further includes a camera configured to detect the relative position,
the controller is configured to estimate the power transmission efficiency based on the relative position, detected by the camera.

9. A control method for a power transmission device, the power transmission device including
a power transmission coil configured to transmit power in a wireless manner to a power reception device, and
an inverter configured to generate an AC transmission power and supply the transmission power to the transmission coil,
the control method comprising:
estimating a power transmission efficiency for transmitting power to the power reception device based on the relative position of the power reception device to the power transmission coil before transmitting power to the power reception device;
setting the transmission power to a first power if the estimated power transmission efficiency is equal to or greater than a threshold;
setting the transmission power to a second power which is higher than the first power if the estimated power transmission efficiency is smaller than the threshold; and
starting transmitting the set transmission power to the power reception device.

* * * * *

UNITED STATES PATENT AND TRADEMARK OFFICE
CERTIFICATE OF CORRECTION

PATENT NO. : 10,894,483 B2
APPLICATION NO. : 16/553955
DATED : January 19, 2021
INVENTOR(S) : Yamato Niwa Page 1 of 3

It is certified that error appears in the above-identified patent and that said Letters Patent is hereby corrected as shown below:

On the Title Page

Item (57), Line(s) 13, delete "tai et" and insert --target--, therefor.

In the Specification

In Column 1, Line(s) 11, after "with", delete ",".

In Column 1, Line(s) 64, delete "sire" and insert --the--, therefor.

In Column 2, Line(s) 62, after "efficiency", insert --,--.

In Column 3, Line(s) 37, after "received", delete ",".

In Column 3, Line(s) 42, after "when", delete ",".

In Column 4, Line(s) 21, delete "readied" and insert --searched--, therefor.

In Column 4, Line(s) 41, delete "anti" and insert --and--, therefor.

In Column 4, Line(s) 48, delete "inserter" and insert --inverter--, therefor.

In Column 5, Line(s) 9, after "reception", delete ",".

In Column 5, Line(s) 66, after "coil", insert --(--.

In Column 6, Line(s) 37, after "illustrating", delete ",".

In Column 6, Line(s) 39, after "frequency f", insert --,--.

Signed and Sealed this
Thirteenth Day of April, 2021

Drew Hirshfeld
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 10,894,483 B2

In Column 6, Line(s) 44, after "start", delete ",".

In Column 6, Line(s) 49, delete "per" and insert --performed--, therefor.

In Column 6, Line(s) 64, delete "drawings, in" and insert --drawings. In--, therefor.

In Column 7, Line(s) 10, delete "the" (first occurrence) and insert --for--, therefor.

In Column 7, Line(s) 11, after "installed", delete ",".

In Column 7, Line(s) 12, after "vehicle 1", delete "," and insert --.--, therefor.

In Column 7, Line(s) 31, delete "art" and insert --an--, therefor.

In Column 8, Line(s) 15, delete "From" and insert --from--, therefor.

In Column 8, Line(s) 19, after "current", delete "is" and insert --Is--, therefor.

In Column 8, Line(s) 25, after "from", delete ",".

In Column 8, Line(s) 28, delete "powers" and insert --power is--, therefor.

In Column 10, Line(s) 21, delete "hi" and insert --in--, therefor.

In Column 10, Line(s) 31, delete "Elitist" and insert --adjust--, therefor.

In Column 10, Line(s) 36, after "embodiments", insert --,--.

In Column 11, Line(s) 2, delete "of" and insert --efficiency--, therefor.

In Column 11, Line(s) 31, delete "it" and insert --inverter--, therefor.

In Column 11, Line(s) 37, delete "for" and insert --f or--, therefor.

In Column 11, Line(s) 45, after "FIG. 4", delete ",".

In Column 11, Line(s) 61, delete "dose" and insert --close--, therefor.

In Column 12, Line(s) 1, after "efficiency)", insert --,--.

In Column 12, Line(s) 23, after "Therefore", insert --,--.

In Column 12, Line(s) 41, after "maximum", delete ",".

In Column 13, Line(s) 17, delete "minim nm" and insert --minimum--, therefor.

CERTIFICATE OF CORRECTION (continued)
U.S. Pat. No. 10,894,483 B2

In Column 13, Line(s) 26, after "reception", delete ",".

In Column 14, Line(s) 51, after "Ps", delete ",".

In Column 15, Line(s) 3, after "set", delete ",".

In Column 15, Line(s) 17, after "Ps", insert --is--.

In Column 15, Line(s) 33, delete "tin" and insert --target--, therefor.

In Column 16, Line(s) 52, delete "230" and insert --250--, therefor.

In Column 17, Line(s) 56, after "reception", delete ",".

In Column 18, Line(s) 10, after "relative", delete ",".

In Column 19, Line(s) 16, after "P1", delete "," and insert --.--, therefor.

In Column 19, Line(s) 44, after "target", insert --transmission--.

In the Claims

In Column 22, Claim 7, Line(s) 29, after "reception", delete ",".